United States Patent [19]

Ho et al.

[11] Patent Number: 5,552,053
[45] Date of Patent: Sep. 3, 1996

[54] SOLID POLY-AMPHIPHILIC POLYMER HAVING USE IN A SEPARATION PROCESS

[75] Inventors: Sa V. Ho; Robert Z. Greenley, both of St. Louis, Mo.; Alan S. Michaels, Chestnut Hill, Mass.

[73] Assignee: Monsanto Company, St. Louis, Mo.

[21] Appl. No.: 340,014

[22] Filed: Nov. 15, 1994

Related U.S. Application Data

[63] Continuation of Ser. No. 88,126, Jan. 13, 1993, abandoned, which is a continuation-in-part of Ser. No. 925,445, Aug. 11, 1992, abandoned.

[51] Int. Cl.$^6$ .................................................. B01D 61/38
[52] U.S. Cl. ...................... 210/640; 210/500.36; 210/490
[58] Field of Search .................................. 210/640, 490, 210/500.36, 650, 651, 652

[56] References Cited

U.S. PATENT DOCUMENTS

| | | |
|---|---|---|
| 3,744,642 | 7/1973 | Scala et al. . |
| 3,816,524 | 6/1974 | Grinstead . |
| 3,951,815 | 4/1976 | Wrasidlo . |
| 4,039,440 | 8/1977 | Cadotte . |
| 4,066,505 | 1/1978 | Schneider . |
| 4,089,778 | 5/1978 | Gauger et al. . |
| 4,113,912 | 9/1978 | Okita . |
| 4,131,604 | 12/1978 | Szycher . |
| 4,237,237 | 12/1980 | Jarre et al. . |
| 4,303,531 | 12/1981 | Kawabata et al. . |
| 4,337,154 | 6/1982 | Fukuchi et al. . |
| 4,385,133 | 5/1983 | Alberino et al. . |
| 4,459,326 | 7/1984 | Colombo et al. ......................... 427/140 |
| 4,544,779 | 10/1985 | Bright . |
| 4,762,899 | 8/1988 | Shikinami . |
| 4,816,130 | 3/1989 | Karakelle et al. . |
| 4,824,443 | 4/1989 | Matson et al. . |
| 4,851,124 | 7/1989 | Vandegrift et al. . |
| 4,967,430 | 11/1990 | Merkel . |
| 4,968,430 | 11/1990 | Hildenbrand et al. ................... 210/640 |
| 4,973,775 | 11/1990 | Sugier et al. . |
| 5,043,073 | 8/1991 | Brunner et al. . |
| 5,045,623 | 9/1991 | Horn et al. . |
| 5,049,275 | 9/1991 | Gillberg-LaForce et al. . |
| 5,071,973 | 12/1991 | Keller et al. ............................... 528/49 |
| 5,153,355 | 10/1992 | Mildenberger et al. . |
| 5,179,190 | 1/1993 | Regen ...................................... 528/272 |

FOREIGN PATENT DOCUMENTS

| | | |
|---|---|---|
| 2014516 | 4/1990 | Canada . |
| 0245857A1 | 5/1987 | European Pat. Off. . |
| 257635 | 8/1987 | European Pat. Off. . |
| 0297252A2 | 5/1988 | European Pat. Off. . |
| 0296098 | 6/1988 | European Pat. Off. . |
| 0336241A2 | 3/1989 | European Pat. Off. . |
| 938700531 | 3/1993 | European Pat. Off. . |
| 0561759A1 | 3/1993 | European Pat. Off. . |
| 159990 | 4/1983 | Germany . |
| 3912531 | 10/1990 | Germany . |
| 58-063445 | 4/1983 | Japan . |
| 2128495 | 5/1984 | United Kingdom . |
| 8531857 | 12/1985 | United Kingdom . |
| 2169301 | 7/1986 | United Kingdom . |

OTHER PUBLICATIONS

Cipriano et al., "Polyurethane Structure Design for Pervaportion Membranes", *J. Membrane Science*, 61, (1991) 65–72.
Maria N. dePinho et al, "Polyurethane Membranes in Pervaporation" *J:Abstracts of Papers of the Am. Chem. Soc.*, 1988, V195.
Kunst, B et al, "Development and Performance of Some Porous Cellulose Acetate Membranes for Reverse Osmosis Desalination", *J. Applied Polymer Science*, vol. 14, (1970) 2559–2568.
Yang et al, "Effects of Different Polyol–terminated Urethane Prepolymers on the Properties of their Corresponding Crosslinked Films", *J. Coatings Technology*, vol. 59, No. 753 (Oct., 1987) pp. 61–69.
Yang et al, "Infrared Spectral Study on the Heat Curing Reaction of Glycerin–Terminated Urethane Prepolymers", *J. App. Polym. Sci.*, 35(2) (1988) pp. 449–464.
Wijmans et al, "Treatment of Organic–Contaminated Wastewater Streams by Pervaporation", *Environmental Progress*, vol. 9, No. 4 (Nov., 1990) pp. 262–267.
Cipriano et al., "Membrane Separation Processes for the Clean Production of Zanthates", *J. Membr. Sci.*, vol. 62, No. 1 (1991) pp. 103–112 (CA:115(20) 210625b).
K. B. Hvid, P. S. Nielsen and F. F. Stengard, "Preparation and Characterization of a New Ultrafiltration Membrane", Nov. 15, 1989—Revised Mar. 29, 1990; pp. 189–202.

*Primary Examiner*—Frank Spear
*Attorney, Agent, or Firm*—Kenneth D. Goetz; Joan V. Thierstein

[57] ABSTRACT

The present invention is directed to a solid poly-amphiphilic polymer. The polymer may be (1) a continuous film (a) which is strengthened sufficiently by cross-linking to be used alone and/or supported on a frame, (b) overlaid and/or cast on a porous hydrophobic support or (2) introduced into the pores of a microporous hydrophobic membrane. The present invention is also a process for selectively removing a dissolved species (solute or target compound) from an aqueous solution or from a gaseous stream comprising contacting said aqueous solution or gaseous stream having the dissolved species and an aqueous stripping solution or other means for removing said species with opposite sides or surfaces.

22 Claims, No Drawings

SOLID POLY-AMPHIPHILIC POLYMER HAVING USE IN A SEPARATION PROCESS

This is a continuation of U.S. application Ser. No. 08/088,126 filed Jan. 13, 1993 now abandoned, which is a continuation-in-part of U.S. application Ser. No. 07/925,445 filed Aug. 11, 1992 now abandoned.

BACKGROUND OF THE INVENTION

1. Field of the Invention

The present invention is directed to a solid poly-amphiphilic polymer. The polymer may be (1) a continuous film (a) which is strengthened sufficiently by cross-linking to be used alone and/or supported on a frame, (b) overlaid and/or cast on a porous hydrophobic support or (2) introduced into the pores of a microporous hydrophobic membrane. It is understood that the pores in either the porous hydrophobic support or microporous hydrophobic membrane lead from one surface of the support or membrane to the other.

The present invention is also a process for selectively removing a dissolved species, particularly polar organic compounds, (solute or target compound), which species may be a liquid or gas, from a gaseous stream or from an aqueous solution comprising contacting said gaseous stream or aqueous solution having the dissolved species and an aqueous stripping solution with opposite sides or surfaces of the solid poly-amphiphilic polymer alone, the polymer on a frame, the polymer on a porous hydrophobic support, or the polymer within the micropores of a hydrophobic membrane. In other words, the separation process of the present invention may be applied to a gas-gas, gas-liquid, or liquid-liquid separation.

2. Description of Related Art

Microporous membranes are well known. These membranes are fabricated from organic polymers as thin films or hollow fibers with continuous networks of interconnected pores leading from one surface to the other. The rate at which solvent, ions, monomer and polymer molecules, and other small particles pass through the pores depends not only on pore size but also on mutual attractions and repulsions between the membrane material and the materials either on the membrane in the pores or the membrane.

These membranes have been used for the separation of very small particles, such as colloids and polymers, from each other or from the liquid in which they are suspended, as separators in rechargeable batteries, in blood oxygenators, wherein the membrane has a liquid in contact with one surface and a gas in contact with the other surface, in other biological and medical applications of microporous membranes such as blood dialysis, where waste products are removed from blood.

The known membranes are also used as supports for liquid membranes, wherein a liquid which is imbibed in the pores of the microporous membrane is the medium through which transport takes place. That is it has been discovered that polyalkylene glycols (polyalkylene oxides) and polypropylene glycols in particular have a strong affinity for phenolic and related compounds such as phenol, nitrophenol, nitroaniline, and the like, and are especially useful for removing such compounds from aqueous solutions. Partition coefficients for these compounds, defined as the quotient or ratio of the concentration of the compound in the polypropylene glycol phase to the concentration of the compound in the aqueous phase with which it is in contact under equilibrium conditions, range from about 150 to over 500. These high partition coefficients are thought to be a consequence of concomitant hydrogen bonding and hydrophobic interaction between the organic compound and the poly-amphiphilic polymeric liquid lodged in a microporous membrane. These liquid membranes imbibed in the pores of the microporous membrane are found in copending U.S. applications Ser. Nos. 07/854,945 and 07/854,945 filed Mar. 20, 1992.

Microporous membranes are made from organic polymers by a variety of known methods. Organic polymers that are currently used to make microporous membranes include cellulose esters, as for example cellulose acetate; polyvinyl chloride; polysulfones and other high temperature aromatic polymers; polytetrafluoroethylene; polyolefins, including polypropylene and polyethylene; polycarbonates; polystyrene; and nylons.

Methods are known for modifying such membranes which involve reactions of monomers or oligomers with other monomers that have highly reactive functional groups. This leads to polymerization or cross-linking. For example, U.S. Pat. No. 3,744,642 describes a reverse osmosis membrane that is made by the interfacial condensation of a diamine and a diacid chloride within a porous substrate made of paper, glass fibers, or polymeric fibers, yielding a composite polyamide membrane. U.S. Pat. Nos. 3,951,815, 4,039,440, and 4,337,154 all are directed to the synthesis of composite reverse osmosis membranes by the cross-linking of amine containing polymers within a porous substrate. However, although the polymerizations are carried out in porous substrates, the resulting membranes are not in general microporous nor do these polymerizations result in the poly-amphiphilic polymers of the present invention.

The above-described approach has been further extended to include polymerizations and cross-linking reactions in the pores of microporous membranes in order to entrap water soluble polymers within the pore networks, thus rendering hydrophobic membranes hydrophilic. U.S. Pat. No. 4,113,912 teaches that a fluorocarbon microporous membrane, such as polyvinylidene fluoride, can be made hydrophilic by filling the pores with an aqueous solution of a water-soluble polymer, as for example polyacrylic acid, polyacrylamide, or polyvinyl alcohol, and then subjecting the polymer-treated membrane to reagents and conditions that lead to insolubilization of the polymer, generally by cross-linking. European Patent Application 257,635 teaches, that hydrophobic membranes, with fluorocarbon membranes used as examples, can be rendered hydrophilic by filling the pores with an aqueous solution containing one or more hydrophilic polyfunctional amine- or hydroxy-containing monomers or polymers, such as water-soluble cellulose derivatives or polyvinyl alcohol, along with cross-linking agents and optional catalysts, surfactants and initiators. The solutions described above are formulated with the goals of improving penetration of the pores and also of inducing cross-linking to take place or causing the hydrophilic compound to chemically bind to the fluorocarbon substrate.

In U.S. Pat. No. 5,049,275 a process is described for modifying the properties of a microporous membrane wherein a polymerizable vinyl monomer and a polymerization initiator are incorporated into the pores of a microporous membrane, and then the vinyl monomer is polymerized so that the polymerized monomer is secured in the pores of the membrane. The polymerizable vinyl monomer consists of one or more monofunctional vinyl monomers and an optional multifunctional vinyl monomer which can act as a cross-linking agent. The method is disclosed as being useful for modifying hydrophobic microporous membranes with hydrophilic monomers, as occurs for example when microporous polypropylene membranes are modified by filling the pores with acrylic acid followed by free radical polymerization.

Cipriano et al., *Journal of Membrane Science*, 61 (1991) 65–72, describe using a cast polyurea polyurethane membrane or film for pervaporation of an ethanol/water mixture. The membrane is prepared by polymerizing trifunctional isocyanate capped prepolymer made by reacting toluene diisocyanate with a trifunctional alcohol containing repeating ethoxy or propoxy groups. The prepolymer polymerized via a urea intermediate formed in the presence of atmospheric water results in structural parameters including structure net holes. (See the Abstract of the paper noted in the starred footnote which Abstract is set out in the Journal: *Abstracts of Papers of the American Chemical Society*, 1988, V195).

SUMMARY OF THE INVENTION

One object of the present invention is a solid poly-amphiphilic polymer (1) which is a continuous film (a) strengthened sufficiently by cross-linking to be used alone and/or supported on a frame or (b) overlaid and/or cast on a porous hydrophobic support, or (2) which is within the pores of a microporous hydrophobic membrane, such that the invention is the microporous hydrophobic membrane having the solid poly-amphiphilic polymer within the micropores of the membrane. If the solid poly-amphiphilic polymer is the continuous film itself, it contains no pores. Further, it is understood that if the solid poly-amphiphilic polymer either overlays or is cast on the porous hydrophobic support or is within the pores of the microporous hydrophobic membrane the pores of the support or membrane lead from one surface of the support or membrane to the other.

Another object of the present invention is to provide a broadly applicable method for providing a poly-amphiphilic polymer useful for a molecular separation, which selectively removes a dissolved species (solute or target compound) from an aqueous solution.

This and other objects as well as the scope, nature and utility of the invention will be apparent to those skilled in the art from the following description and appended claims.

DESCRIPTION OF THE INVENTION

The present invention is directed to a solid poly-amphiphilic polymer which is prepared in the form of a continuous film. This film may be sufficiently strong itself or may be sufficiently strong if supported on a frame to accomplish the object of the method of the invention. The strength of the film may be increased by cross-linking the solid poly-amphiphilic polymer.

Contrary to the limit on the cross-linking expected to be necessary to avoid a declining removal rate of the dissolved species from an aqueous solution relative to such cross-linking, the present invention provides a lesser drop in permeability with increasing cross-linking than is expected. In other words, it appears the present invention provides unexpected mobility relative to increased cross-linking.

On the other hand, the poly-amphiphilic polymer is formed into a continous film overlaid or cast on a porous support or the poly-amphiphilic polymer is introduced into the pores of a microporous membrane. Both the porous support or the microporous membrane are hydrophobic.

The solid poly-amphiphilic polymer of the present invention whether in the form of a film or within the pores of a microporous membrane has particular utility for selectively removing (i.e., transferring) dissolved specie(s), such as organic materials and particularly polar organic compounds, from an aqueous solution, which may have a high concentration of inorganic salts.

The present invention is also directed to a process for selectively removing the dissolved specie from a gaseous stream, i.e., gas-gas separation, in a manner analogous to that described above in removing the specie from an aqueous media. In other words, the present method comprises contacting opposite sides of a solid poly-amphiphilic membrane described herein with said gaseous stream and a means driving the continued transport across the membrane. The driving force can be the same as that for separation of the specie from an aqueous solution set out herein.

The dissolved species permeate or diffuse through the solid poly-amphiphilic polymer and, depending on the dissolved specie(s), may be recovered from the film or membrane, for example, by an aqueous stripping solution or by pervaporation. By this process, a small volume of stripping solution can be used to treat a relatively larger volume of aqueous solution efficiently. Accordingly, the present process has particular applicability in water pollution control, although it is not limited to such applications.

By the use of solid poly-amphiphilic polymers, high selectivity and high transport of organic materials, and particularly organic polar compounds, are obtained while the instability problems which have confounded the prior art immobilized liquid membranes have been substantially overcome. In terms of the present invention, the solid poly-amphiphilic polymer should contain a plurality of hydrophobic regions and polar regions, such that the solid polymer has a high affinity for organic compounds, and particularly polar organic compounds, while it exhibits a low affinity for water. Specifically these hydrophobic regions and polar regions may be alternating regions.

In other words, the term poly-amphiphilic polymer refers to a class of polymers having polar regions and hydrophobic regions. These regions of polarity and hydrophobicity typically alternate along the polymer backbone in such a manner that the molecule has a high density of both polar and hydrophobic moieties. Such poly-amphiphilic polymers can be prepared for example by polymerizing moderately polar organic monomers, preferably monomers having only a slight water solubility, or by functionalizing hydrophobic polymers with polar moieties.

Also the hydrophobic polymers may be cross-linked.

The present invention is essentially a hydrophobic polymer having incorporated therein repeated units of a functional group of a selective extractant, particularly a small molecule extractant. (See C. Judson King, *Separation Processes*, 2nd. Ed., Chapter 14, "Selection of Separation Processes" pp. 728–776, particularly pp. 757–771.)

As a general rule, the formula of suitable hydrophobic polymeric poly-amphiphilic compounds contain a repeating unit such as follows:

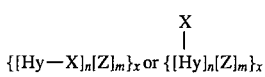

Where Hy is a hydrophobic moiety which is essentially water insoluble and water immiscible; X is a polar moiety that contributes to a selective affinity for polar organic target compounds; and Z is a linking moiety. The repeating values, n, m, or x is a number representing the average number of repeating units (e.g. monomer units) necessary to make a solid polymer. Suitable hydrophobic moieties include a hydrocarbon moiety such as linear or branched alkylene groups, preferably containing from 3 to 5 carbon atoms, which may be substituted with other hydrocarbon radicals. For example, alkylene moieties of the formula

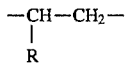

where R is methyl (propylene) or ethyl (butylene) have proven to be useful. Other R substituents may include, for example, cycloalkyl and aryl groups. Suitable polar moieties (X) may include moieties containing an ether linkage (—O—), a carbonyl

an amino (—NR'—), an ester

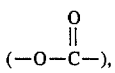

a sulfone

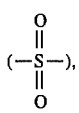

a sulfoxide

phosphine oxides

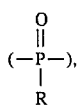

phosphinates

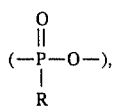

phosphonates

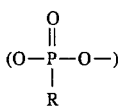

and the like where R' is hydrogen or R and where R is as defined above. Suitable linking moieties (Z) may include moieties containing an ester linkage

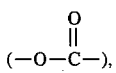

a urethane linkage

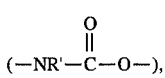

an amide linkage,

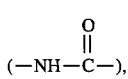

a urea linkage

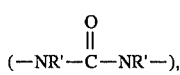

or an N oxide linkage

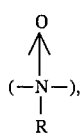

and the like where R and R' are as defined above. Polymers containing a variety of different types of alternating hydrophobic regions and polar regions are also contemplated. The governing condition is that the hydrophobic, polymeric poly-amphiphilic compound be a solid and is substantially water insoluble and water immiscible as defined above.

An example of such a polymer and its synthesis is as shown in Scheme 1.

SCHEME 1

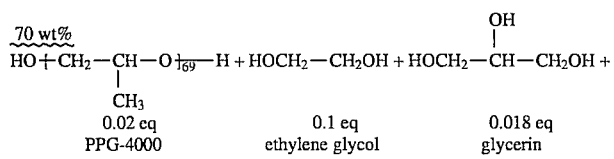

-continued
SCHEME 1

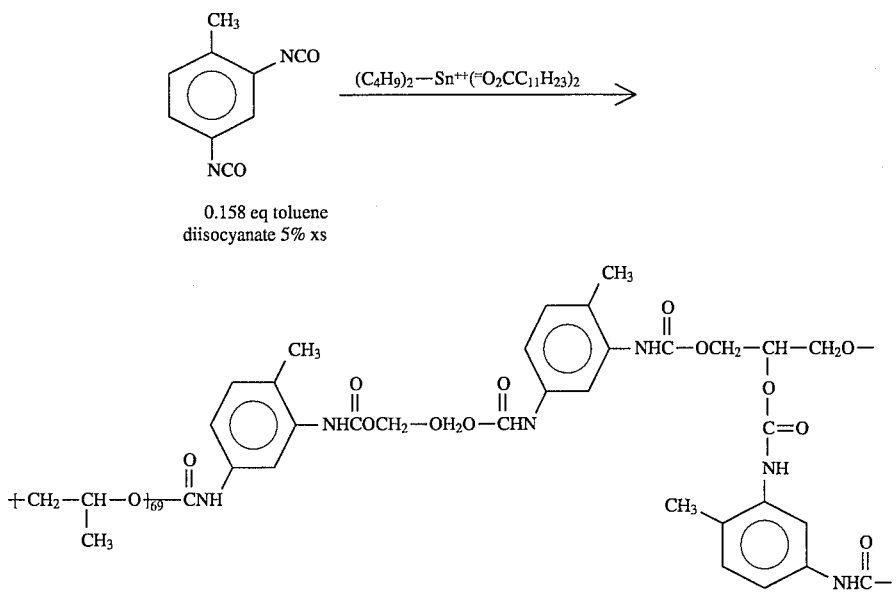

There are a wide variety of known water-insoluble and water immiscible polymeric solids falling within this generic definition which can be used in preparing the solid amphiphilic polymer of the present invention. Either natural or synthetic hydrophobic, polymeric solids potentially can be used. Representative of suitable polymeric solids are polyalkylene oxides, particularly polypropylene glycols, polytetramethylene glycols, polypentamethylene glycols, polyhexamethylene glycols and polyheptamethylene glycols, polyesters, polyureas, polyurethanes, and the like. Solid polymers, may be made into a continuous film or polymerized in or compressed into the pores of a microporous membrane. Such solid polymers are safe to handle and highly resistant to mechanical loss from the hydrophobic microporous support.

Specifically the polyurethane is prepared by reacting a diisocyanate with a difunctional active hydrogen-containing agent.

Suitable diisocyanates include p-phenylene diisocyanate, 2,4-toluylene diisocyanate (TDI), 2,6-toluylene diisocyanate, 4,4'-diphenylmethane diisocyanate (MDI), naphthalene-1,5 diisocyanate, hexamethylene diisocyanate, lysine diisocyanate, xylene diisocyanate hydrogenated TDI and MDI, dicyclohexyldimethylmethane p,p'-diisocyanate, isophorone diisocyanate and diethyl fumarate diisocyanate.

The difunctional active hydrogen-containing material is preferably a polyalkylene oxide such as polyoxymethylene glycol (PMG), polyethylene glycol (PEG), polypropylene glycol (PPG), polybutylene glycol (PBG), polytetramethylene glycol (PTMG) and the like. Polyalkylene oxides having a molecular weight between about 400 and about 4,000 can be suitably employed, with polyalkylene oxides having a molecular weight between about 1000 and about 4000 finding the widest application.

Also among the difunctional active hydrogen-containing material is the material having the tradename Jeffamine®.

Difunctional polyester diols also can be used in the present invention. A small amount of a monomeric diol, such as 1,3-propanediol, 1,4-butanediol, 1,5-pentanediol, 1,6-hexanediol, diethylene glycol, triethylene glycol, tetraethylene glycol and the like may be added to influence the structure and properties of the polyurethane.

To form the cross-linked polyurethane of the present invention, the diisocyanate is reacted with the difunctional active hydrogen-containing material in the presence of a small amount of a cross-linking agent. The cross-linking agent is a tri- or higher functional monomeric compound that causes the polyurethane to have a three-dimensional structure. Suitable cross-linking agents include such multi-functional active hydrogen-containing compounds as triols, tetrols, pentols, triamines, tetramines, pentamines and the like, as well as multi-functional isocyanates. Suitable isocyanate-terminated cross-linking agents also can be prepared by capping the above-noted multi-functional active hydrogen-containing materials with diisocyanates. Preferably, the cross-linking agent is a tri-functional monomer such as glycerol or a diisocyanate capped glycerol.

The polyurethane usually is prepared by reacting the difunctional active hydrogen-containing material with a slight molar excess of the diisocyanate in the presence of a small amount of the cross-linking agent. The amounts of isocyanate, polyalkylene oxide and cross-linking agent employed should be sufficient to provide at least about 1.02, and preferably about 1.05-NCO groups per each free hydroxy group in the urethane forming reaction mixture. The molar ratio of the cross-linking agent to the polyalkylene oxide should be less that about 1.–1.5. The reaction can be conducted in the presence of a urethane catalyst, i.e. a catalyst for facilitating the reaction between an isocyanate moiety and an active hydrogen. Suitable urethane catalysts are selected from those in TABLES I and II as follows:

TABLE I

| Catalyst Strength and Base Strength for Amine Catalysts[a] | | |
|---|---|---|
| Amine Catalyst | Ionization constant at 25° C. | Rate Constant, $k \times 10^4$ liters mole$^{-1}$ sec$^{-1}$ |
| Quinoline | $6.3 \times 10^{-10}$ | 48 |
| Pyridine | $2.3 \times 10^{-9}$ | 93 |
| α-Picoline | $3 \times 10^{-8}$ | 101 |
| Triethylamine | $5.65 \times 10^{-4}$ | 1240 |

TABLE I-continued

Catalyst Strength and Base Strength for Amine Catalysts[a]

| Amine Catalyst | Ionization constant at 25° C. | Rate Constant, k × 10$^4$ liters mole$^{-1}$ sec$^{-1}$ |
|---|---|---|
| Dimethylaniline | 1 × 10$^{-9}$ | 0 |
| Diethylaniline | 4.5 × 10$^{-8}$ | 0 |

TABLE II

Catalysis of Butanol-Phenyl Isocyanate Reaction[a]

| Catalyst | Relative Reactivity | Mole % Catalyst |
|---|---|---|
| None | 1.0 | 1.0 |
| N-Methylmorpholine | 4 | 1.0 |
| Triethylamine | 8 | 1.0 |
| N,N,N',N'-Tetramethyl-1,3-butanediamine | 27 | 1.0 |
| Triethylenediamine | 120 | 1.0 |
| Ferric acetyl acetonate | 3,100 | 0.01 |
| Tri-n-butyltin acetate | 31,000 | 0.001 |
| D-n-butyltin dichloride | 57,000 | 0.001 |
| Di-n-butyltin diacetate | 56,000 | 0.001 |
| Di-n-butyltin sulfide | 20,000 | 0.001 |

[a]In dioxane at 70° C.[18]

See *Organic Chemistry of Synthetic High Polymers:* Interscience Press (1967) by Robert W. Lenz. The reaction also can be conducted in the absence of catalyst at an elevated temperature.

Foaming during formation of the polyurethane is undesired, or if allowed can be permitted only to the extent that closed cell foam results. Therefore, water should be excluded by reasonable means. That is, it should be essentially excluded from all reactants or permitted only to the extent that the desired closed-cell foam results are obtained.

While the polyurethane can be cast as a thin continuous film, in accordance with one embodiment of the present invention, the polyurethane or cross-linked polyurethane is impregnated into the pores of a hydrophobic microporous membrane support.

A preferred embodiment of the present invention includes a membrane which is 70% holes in which the holes are filled with polyurethane, which may be cross-linked. The film is preferable produced having a ratio of PPG to polyurethane of 65–80% PPG to polyisocyanate by weight.

Another preferred embodiment includes a film having less cross-linking i.e. less than 65% PPG to polyisocyanate by weight providing a polyurethane which is stiff enough to be supported by a frame.

Membranes of the present invention are prepared, for example, by contacting the hydrophobic microporous support with the a reacting mass of the isocyanate, active hydrogen material, cross-linking agent and catalyst. The viscous reaction mixture can be impregnated into the microporous membrane using a "doctor blade" or drawdown rod. Using a less active urethane catalyst, such as triethylamine, the viscosity of the polymerizing reaction mixture will remain low enough for a long enough time period to permit its impregnation into the microporous membrane.

In an alternative approach, the pores of the microporous membrane support first could be filled with an uncatalyzed mixture of the reactants followed by contacting the loaded support with a solution (e.g. about 1 wt. %) of the urethane catalyst in an inert solvent (e.g., hexane). In this approach it would be desirable to use a more active urethane catalyst such as di-butyltin dilaurate. Low molecular weight adducts and other non-polymerized material would be washed from the support.

Solid polymers of the present invention also are sufficiently stable against physical expulsion (e.g., bleeding or weeping) from the support or porous matrix, but still capable of withstanding the relatively large static pressure differences as well as in withstanding chemical stress of the organic solvents as compared with the prior art. The polymer may be cross-linked to increase its strength but not cross-linked to such an extent that it becomes brittle or that it no longer transports species sufficiently to obtain the desired separation. Thus, for optimal usage in the form of a film, the film is either physically manipulated, i.e. highly stretched, to make it thinner or a thinner crosslinked film of starting monomer or oligomer is prepared for polymerization. Further, to load the solid polymer into the micropores of the microporous matrix of the hydrophobic microporous membrane, either the solid polymer blended with a carrier solvent, as described in U.S. Pat. No. 4,973,434, or the components of the solid polymer may be introduced into the pores, with subsequent polymerization of the components in the pores. The solution facilitates loading of the solid polymers into the porous matrix of a hydrophobic microporous support. The carrier solvent would thereafter be removed, e.g. by evaporation, to leave the substantially pure solid polymer in the pores of the membrane. The solid polymer may also be compressed into the pores mechanically. Although the polymer may shrink from the walls of the pores, the mechanical encumbrance of such a solid provides stability to the maintenance of the solid in the pore during its utility.

Hydrophobic microporous membranes suitable for use in the present invention and their methods of preparation are well known in the art and need not be described in detail. In this regard, please refer to U.S. Pat. Nos. 3,426,754; 3,801,404; 3,802,444; 3,839,516; 3,843,761; 3,843,762; 3,920,785; 4,255,376; 4,257,997; 4,276,179; 4,359,510 and 4,438,185, the disclosures of which are hereby incorporated by reference. Broadly, any hydrophobic microporous material, i.e., a material not spontaneously wet by water, having an open-celled structure can be used in the present invention. The membrane need only have the pore size consistent with efficient transport of the target compound(s), and the largest porosity and smallest thickness consistent with adequate mechanical integrity is preferred. In the case of the use of a membrane as a porous hydrophobic support, the pore size may be as large as is feasible to maintain the integrity of the solid polymer film which is either applied as an overlay or cast on the support. The membrane support also should be composed of a material which is chemically stable to the aqueous feed or waste solution, and the aqueous stripping solution which may be strongly acidic or basic. Such materials include polyolefins, polysulfones, polytetrafluoroethylenes, polystyrenes, and the like.

Microporous membranes and porous supports meeting these descriptions are commercially available from several sources and are well known to those skilled in this art. In such materials, the pores or micropores are interconnected through paths which extend from one external surface or surface region to another. The pores of commercially available microporous material fall predominantly in the range of about 0.02 to 2 microns in effective diameter, although the size of individual pores often are highly variable, and pores as small as 0.01 micron and are large as 10 microns are not unusual.

To ensure an open pore structure the overall porosity of the material should preferably be at least about 20%. Typically, commercially available microporous membrane supports will have a porosity of from about 30 to 80%, with a more usual porosity for an isotropic membrane like the Celgard® membrane being in the range of about 40 to 50%. Porosity is defined as the fractional volume (expressed as a percent) of the membrane that is open rather than substrate material. Porosity can be assessed in an alternative fashion by reference to the material's bulk density. Suitable microporous materials will have a bulk density lower than the bulk density of the same polymeric material having no cellular structure. Bulk density refers to the weight of the material per unit of its gross volume, where gross volume is the volume of fluid displaced, where the fluid such as mercury, exhibits a surface tension that prevents it from flowing into the micropores of the material. See mercury volumenometer method in *Kirk-Othmer Encyclopedia of Chemical Technology*, Vol. 4, page 892 (1949).

While the porosity of the support oftentimes will be uniform across its cross-section, in an alternative embodiment, the hydrophobic microporous membrane may have an asymmetric porosity. For example, the surface region of the support may have smaller pores and/or a lower porosity than the major matrix region, whose more open porosity facilitates transport of the target component. Such a construction may provide higher transfer rates relative to use of uniform porosity membrane supports. An asymmetric polysulfone membrane meeting such a construction is disclosed in U.S. Pat. No. 5,030,672, the disclosure of which is incorporated by reference.

Thinner membranes will provide higher diffusion rates of the target component through the membrane. Membrane stability and support strength considerations, however, limit the extent to which this approach can be used to enhance performance. Typically, commercial membrane support thicknesses range between 10 and 200 microns.

One preferred hydrophobic microporous film useful as the microporous support in the present invention is the CELGARD® polypropylene materials available from Hoechst Celanese Separations Products Division, Hoechst Celanese Corporation, South Point, N.C. Such microporous materials are available either in sheet form or as microporous hollow fibers. Another useful material is the fluorinated hydrocarbon polymers, particularly of the type designated Gortex®, a trademark of W. L. Gore & Associates, Inc., Newark, Del. and the polypropylene hollow fibers available from Akzo N.V. under the Accurel® label.

For another particular application, a solid polymer is polymerized for the preparation of the continuous film, either for use alone, on a frame or a porous membrane. The polymer is chosen to maximize the selective affinity for the target compound(s) desired to be removed selectively from, for example, an aqueous solution and to maximize the rate of transport of the target compound(s) through the solid polymer. An important advantage of forming the solid polymer of the present invention is that it is possible to introduce and modify various functional groups along a polymer backbone to enhance an oligomer's or polymer's selective affinity and transport rate for the component (typically a polar organic compound) targeted for transport across the solid polymer. Such modification of the polymeric solid may improve both the selectivity for the target component as well as its rate of transport through the solid polymer.

In fact, the solid polymers of the present invention can be used not only to recover but also to separate one or more organic compounds selectively from other organic compounds in an aqueous liquid based on differences in physical properties such hydrophobicity, hydrogen-bonding capability, their degree of dissociation in an aqueous medium, as indicated by the pKa's and the like.

It is now found there is a correlation between partition coefficients of the known octanol/water system and the present membrane system.

| COMPOUND | $K_{Octanol/Water}$ | $K_{PPG-4000/Water}$ |
|---|---|---|
| Acrylic Acid | 1.35 | 5 |
| Phenol | 28.8 | 150 |
| p-Nitrophenol | 77 | 300 |
| Toluene | 537 | 1000 |

This correlation provides a basis for determining applicability of the solid poly-amphiphilic membrane of the present invention. See, for example, "TABLE 1A. Water Solubility, Vapor Pressure, Henry's Law Constant $K_{oc}$, and $K_{ow}$ Data for Selected Chemicals," in the March 1990 Manual EPA/ 600/8-90/003.

The solid polymers of the present invention are particularly useful for selectively removing low levels of low molecular weight organic compounds, and particularly polar organic compounds such as alcohols, phenolic compounds, including phenol and substituted phenol, carboxylic acids, organic amines, including aromatic amines, ketones, aldehydes, organic nitriles and the like, from aqueous streams containing high levels of inorganic salts which cannot pass through the solid polymers. Such streams present a common disposal problem for industry due to the prevalent use of acid-base chemistry for organic synthesis. Normally, the presence of salts complicates treatment options, thus increasing disposal costs. The present invention provides a direct solution. The solid polymer of the present invention is selected for its effective impermeability to water and particularly to highly water-soluble materials such as inorganic salts and ionic organic species. Such polymers allow ready transport of low molecular weight nonionized organic compounds and in particular polar organic compounds. Moreover, as noted above, the present invention provides a way for selective separation of a polar organic compound from other organic compounds in an aqueous medium based on differences in the physical properties of the various organic species.

In use, the solid polymers of the present invention may be positioned between two liquids, such as two aqueous solutions, or between a gaseous stream and an aqueous solution. One solution or one gaseous stream, e.g., an aqueous waste stream or a gaseous waste stream, which contains the target organic compound(s) to be extracted, contacts one side of the membrane and an aqueous stripping solution contacts the other side to accept the target compound after it diffuses through the solid polymer. The stripping solution can operate either in a passive mode, i.e., where the driving force for transport of the targeted compound from the solid polymer simply is dilution, or in an active mode where the target compound is chemically altered upon passing from the solid polymer into the stripping liquid. Chemical alteration of the target compound can be as simple as a change in its ionization state, such as from pH control, or a catalytic or biologically induced change. For example, a phenolic compound can be converted to its phenate salt via pH control using an alkaline material in aqueous stripping liquid.

In an alternate approach, the stripping side of the solid polymer can be placed under a vacuum or swept with a gas, preferably inert, such as air or nitrogen, to remove the target compound by evaporation. Obviously this approach, referred to in the art as pervaporation, is useful only in those instances with the target compound that exhibits a sufficient volatility.

In one useful embodiment, the aqueous solution or gaseous stream containing the target compound(s) is circulated through the lumens of elongate hollow fibers having microporous walls supported in a housing, the fiber walls have the solid polymers within the pores or the wall and the stripping solution is circulated over the outside of the fibers. In another embodiment, referred to in the art as a plate-and-frame configuration, the solid polymer (in film form, unsupported or on a frame or porous support, or in the pores of a microporous membrane) is located within a liquid-tight housing and divides the interior of the housing into at least two chambers, an aqueous feed solution chamber and a stripping solution chamber. The solid polymer provides communication between the two chambers. In both arrangements, the housing is provided with inlet and outlet ports or manifolds which permit aqueous feed solution and stripping solution to be introduced and discharged.

In this embodiment, the aqueous solution or gaseous stream containing the target compound(s) may be circulated on one side of the continuous film prepared from the solid polymer which is supported on a frame. The frame is the support for the film in a manner sufficient to protect the integrity of the film. Such preparation is carried out in consideration of a thickness to optimize the passage of the target compounds through the film at the same time as optimizing the stability of the film in relation to the support provided by the frame. In other words, the film may be made by casting on a structured support which may itself sperate as the frame or which may be replaced by the frame to provide support for the film. Such a frame and its structure is readily determined by an ordinarily skilled artisan in such a manner as to provide the satisfy the functionality necessary to support the film of the present invention.

The polyurethane, either supported on a frame or porous support or impregnated in a microporous membrane within the present invention is particularly useful for selectively removing low levels of low molecular weight organic compounds, and particularly polar organic compounds such as alcohols, phenolics, carboxylic acids, ketones, aldehydes, nitriles and the like, from aqueous streams containing high levels of inorganic salts. Such streams present a common disposal problem for industry due to the prevalent use of acid-base chemistry for organic synthesis. Normally, the presence of salts complicates treatment options, thus increasing disposal costs. The present invention provides a direct solution. The membrane of the present invention is selected for its effective impermeability to water and particularly to highly water-soluble materials such as inorganic salts and ionic organic species, allowing ready transport of low molecular weight nonionized organic compounds and in particular polar organic compounds.

The following examples are given as specific illustrations of the present invention, and not for the purpose of limiting the invention. Reference should be made to the appended claims to determine the invention's scope.

The principles, preferred embodiments and modes of operation of the present invention have been described in the foregoing specification. The invention which is intended to be protected herein, however, is not to be construed was limited to the particular forms disclosed, since they are to be regarded as illustrative rather than restrictive. Variations and changes may be made by those skilled in the art without departing from the spirit of the invention.

EXAMPLE 1

A mixture containing 20 grams PPG-4000 (from Aldrich), 1.65 g ethylene glycol and 0.3 g glycerin is stirred for ½ to 1 h until homogeneous. To this mixture 5.6 ml toluene di-isocyanate (TDI, 80% 2,4-isomer; 20% 2,6-isomer from Aldrich) is added and stirred for 1–2 minutes. 0.25 ml of dibutyltin dilaurate (a catalyst for the cross-linking reaction) is added and films are cast from the mixture using any standard film casting method. The films are them heated at 70° C. for 1 to 2 h to complete the reaction.

Membranes comprising PPG cross-linked inside porous supports such as Celgard are prepared by wetting the support first with the above mixture prior to the addition of the dibutyltin dilaurate catalyst. After the mixture completely penetrates the porous matrix, which would typically take no more than about 5 to 10 minutes, any excess solution is wiped off and the catalyst is applied to the surface of the wetted membrane as 1% solution in hexane. The membrane is then heated at 70° C. for 1 to 2 h as above to complete the reaction.

EXAMPLE 2

A cross-linked polyurethane-polypropylene glycol (PPG) film (50 micrometers thick) prepared in accordance with the procedure of Example 1 is placed between two compartments of a membrane cell. Surface area of the membrane is 8 cm$^2$. One compartment contains an aqueous waste solution having para-nitro phenol (PNP) at 4000mg/L and 20 wt. % KCl. The other compartment contained 0.1 N NaOH as a strip solution. Both solutions are circulated through the compartment by pumps. Total volume of liquid on each side is 30 ml. The system is operated at room temperature.

PNP levels in both compartments are measured periodically using a spectrophotometric method. The overall mass transfer coefficient obtained is $2.7 \times 10$ cm/sec. Overnight, the PNP level in the aqueous waste solution dropped to about 8 mg/L, equivalent to 99.8% PNP removal.

EXAMPLE 3

A polyurethane impregnated membrane obtained by cross-linking PPG-4000 in the pores of Celgard 2500 porous membrane is prepared as described in Example 1 and is tested for PNP removal using the same procedure as in Example 2. The overall mass transfer coefficient obtained is $2.2 \times 10^{-4}$ cm/sec. Overnight, PNP level in the feed dropped to about 6 mg/L, equivalent to over 99.8% PNP removal.

EXAMPLE 4

The same membrane tested in Example 3 is used to treat an actual waste stream containing a mixture of monobasic carboxylic acids from $C_2$ to $C_6$ having a total organic (TOC) concentration of 1635 mg/L and containing 1% nitric acid. The experimental procedure described Example 1 is used with the waste solution in one compartment and 0.1 N NaOh as a strip solution in the other compartment of the membrane cell. The system is operated at 65° C. Organic levels in both compartments are measured periodically using a TOC (Total Organic Carbon) machine. The average overall mass transfer coefficient obtained is $3.1 \times 10^{-4}$ cm/sec. After 5.5 hours of operation, the TOC level in the waste solution dropped to 426 mg/L, equivalent to about 74% TOC removal.

EXAMPLE 5

The membrane of Example 4 is used for removal of butanol from an aqueous solution. The butanol is removed through the membrane by pervaporation. The feed solution containing 0.5 wt. % butanol in water is placed on one side of the membrane cell with air flowing on the other side to remove butanol permeating through the membrane. The system is operated at 65° C. Butanol level is determined by measuring the TOC of the aqueous solution. The overall mass Transfer coefficient obtained is $2.1 \times 10^{-4}$ cm/sec. After 5 h of operation about 64% of butanol is removed from the solution.

EXAMPLE 6

The cross-linked PPG film of Example 2 also is used to remove butanol from an aqueous solution using the procedure of Example 5. The overall mass transfer coefficient obtained is $2.7 \times 10^{-4}$ cm/sec. After 6 h of operation, about 78% of butanol is removed from the solution.

EXAMPLE 7

In this example, the PPG cross-linking reaction is carried out by heat alone without using the catalyst (dibutyltin dilaurate). A solution containing 10.61 g PPG-4000, 0.159 g glycerin and 0.83 ml TDI is thoroughly mixed in a glass jar at room temperature. Part of this mixture is then used to wet a piece of Celgard 2400 porous membrane, and excess solution is carefully removed from the surfaces of the Celgard membrane so that only its pores contain the precursor polymeric mixture. Both the original solution in the jar and the wetted Celgard membrane are then heated in an oven maintained at 60° C. for over 110 h to complete the reaction. When cooled down to room temperature, the liquid mixture in the jar forms a solid, rubbery material, indicating that the cross-linking reactions are completed. The Celgard membrane thus impregnated with polyurethane (cross-linked PPG-4000) is used for PNP removal following the same procedure of Example 2. The overall mass transfer coefficient obtained is $3.8 \times 10^{-4}$ cm/sec. Overnight, PNP level in the feed solution dropped to about 6 mg L, equivalent to over 99.8% PNP removal from the feed.

The principles, preferred embodiments and modes of operation of the present invention are described in the foregoing specification. The invention which is intended to be protected herein, however, is not to be construed as limited to the particular forms disclosed, since they are to be regarded as illustrative rather than restrictive. Variations and changes may be made by those skilled in the art without departing from the spirit of the invention.

What is claimed is:

1. A solid poly-amphiphilic polymer having repeating units of the formula

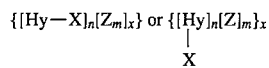

which are crosslinked to make the polymer solid and wherein Hy is a hydrophobic moiety which is essentially water insoluble and water immiscible; X is a polar moiety with a selective affinity for polar organic target compounds; Z is a linking moiety, and n, m or x is a number wherein the average total of the numbers represents repeating units and which is (1) a continuous film to be used alone, supported on a frame, or overlaid or cast on a porous hydrophobic support; or within the pores of a microporous hydrophobic membrane.

2. The solid polymer of claim 1 where the hydrophobic moiety (Hy) is a linear or branched alkylene group of 3 to 7 carbon atoms.

3. The solid polymer of claim 1 where the hydrophobic moiety (Hy) has the formula

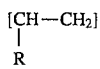

where R is an alkyl group of 1 to 4 carbon atoms, a cycloalkyl of 4 to 8 carbon atoms, an aryl group, an alkylaryl group or an arylalkyl group.

4. The solid polymer of claim 3 wherein said solid polymer includes a group consisting of polyalkylene oxides, polyesters, polyureas, polyurethanes and functionalized polyolefins.

5. The solid polymer of claim 4 wherein said polyurethane is prepared by reacting a polypropylene glycol and an organic diisocyanate.

6. The solid polymer of claim 5 wherein said polymer is cross-linked polyurethane-polypropylene.

7. The solid polymer of claim 6 wherein the polyurethane-polypropylene is in a ratio by weight of polypropylene to polyisocyanate by weight of about 65 to 80%.

8. The solid polymer of claim 7 wherein the polyurethane-polypropylene is in a ratio by weight of polypropylene to polyisocyanate of less than 65% and more than a percentage necessary to provide enough stiffness to be supported on the porous support.

9. The solid polymer of claim 8 wherein the said polymer is polyurethane.

10. The solid polymer of claim 2 wherein the polar moiety X is selected from an ether linkage (—O—), a carbonyl

an amino (—NR'—), an ester

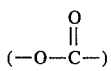

a sulfone

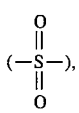

a sulfoxide

phosphine oxides

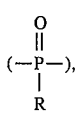

phosphinates

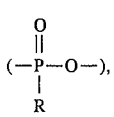

phosphonates

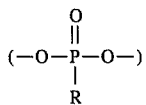

and the like where R' is hydrogen or R and R is as defined above.

11. A solid polymer of claim 1 wherein the linking moiety Z is an ester linkage

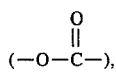

a urethane linkage

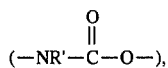

an amide linkage

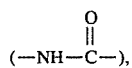

a urea linkage

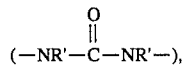

or an N oxide linkage

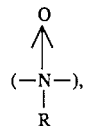

and the like where where R' is hydrogen or R and R' is as defined above.

12. A process for removing an organic compound from an aqueous solution which comprises contacting said aqueous solution with one side of the solid polymer of claim 1 and removing the compound from the other side of the solid polymer.

13. The process of claim 1 wherein said organic compound is a polar organic compound.

14. The process of claim 1 wherein said aqueous solution contains a high concentration of dissolved inorganic salt.

15. A method for selectively removing a polar organic compound from an aqueous solution containing a high concentration of dissolved inorganic salt comprising the process of claim 1.

16. The method of claim 15 wherein said polar organic compound is selected from the group consisting of alcohols, phenolic compounds, organic acids, organic amines, ketones, organic nitriles and aldehydes.

17. The method of claim 16 wherein said organic compound is ionizable in aqueous solution.

18. A microporous hydrophobic membrane of claim 2 having the polymer within the pores.

19. A continuous film of claim 1 wherein the solid polymer is supported on a frame or is cast on a porous hydrophobic support which is a separation membrane for use to remove organic compounds from a waste stream 20. A continuous crosslinked film of the solid poly-amphiphilic polymer of claim 24 which is a separation membrane for use to remove organic compounds from a waste stream.

21. A microporous hydrophobic membrane having the solid poly-amphiphilic polymer of claim 24 in the pores which is a separation membrane for use to remove organic compounds from a waste stream.

22. A method of selectively removing a volatile organic compound from a gaseous stream comprising contacting opposite side of the solid poly-amphiphilic polymer of claim 1 with said gaseous stream and a means for removing said organic compound from an opposite side of said supported membrane selected from 1. pickup (strip solution),
2. pH,
3. pervaporation,
4. biological or reaction degradation, or
5. a combination of 1 through 4.

* * * * *